United States Patent
Khankin (10) Patent No.: US 12,001,311 B2
(45) Date of Patent: Jun. 4, 2024

(54) AUTOMATIC GENERATION OF COMPUTATION KERNELS FOR APPROXIMATING ELEMENTARY FUNCTIONS

(71) Applicant: Next Silicon Ltd, Tel Aviv (IL)

(72) Inventor: Daniel Khankin, Beer Sheva (IL)

(73) Assignee: Next Silicon Ltd, Givatayim (IL)

( * ) Notice: Subject to any disclaimer, the term of this patent is extended or adjusted under 35 U.S.C. 154(b) by 221 days.

(21) Appl. No.: 17/569,566

(22) Filed: Jan. 6, 2022

(65) Prior Publication Data

US 2023/0214307 A1    Jul. 6, 2023

(51) Int. Cl.
- *G06F 11/34* (2006.01)
- *G06F 11/30* (2006.01)
- *G06F 17/17* (2006.01)

(52) U.S. Cl.
CPC ...... *G06F 11/3433* (2013.01); *G06F 11/3089* (2013.01); *G06F 11/3452* (2013.01); *G06F 17/17* (2013.01)

(58) Field of Classification Search
None
See application file for complete search history.

(56) References Cited

U.S. PATENT DOCUMENTS

| | | | |
|---|---|---|---|
| 10,091,030 B2 * | 10/2018 | Soulier | H04L 25/0305 |
| 2016/0085511 A1 * | 3/2016 | Yukiyama | G06F 7/535 |
| | | | 708/209 |
| 2017/0141796 A1 * | 5/2017 | Koike-Akino | H03M 13/6588 |
| 2019/0079803 A1 | 3/2019 | Raz et al. | |

OTHER PUBLICATIONS

European Search Report and the European Search Opinion dated May 26, 2023 From the European Patent Office Re. Application No. 23150572.8. (14 Pages).

(Continued)

*Primary Examiner* — Eric Coleman (57) ABSTRACT

An apparatus for computing functions using polynomial-based approximation, comprising one or more processing circuitries configured for computing a polynomial-based approximant approximating a function by executing one or more iterations. Each iteration comprising computing the polynomial-based approximant using scaled fixed-point unit(s) according to a constructed set of coefficients, minimizing an approximation error of the computed polynomial-based approximant compared to the function while complying with one or more constraints selected from a group comprising at least: an accuracy, a compute graph size, a computation complexity, and a hardware utilization of the processing circuitry(s), adjusting one or more of the coefficients in case the approximation error is incompliant with the constraint(s) and initiating another iteration. The polynomial-based approximant and its adjusted set of coefficients for which the computed polynomial-based approximant complies with the constraint(s) may be output to one or more processing circuitries configured to approximate the function by computing the polynomial-based approximant.

18 Claims, 3 Drawing Sheets

(56) References Cited

OTHER PUBLICATIONS

Ercegovac "A General Hardware-Oriented Method for Evaluation of Functions and Computations in a Digital Computer", IEEE Transactions on Computers, C-26(7):667-680, Jul. 1977.
Jarlebring et al. "Computational Graphs for Matrix Functions", ACM Transactions on Mathematical Software, 48(4): Article No. 39, 1-35, Mar. 22, 2023.
Przybyl "Fixed-Point Arithmetic Unit with a Scaling Mechanism for FPGA-Based Embedded Systems", Electronics 2021, 10(10), 1164: 1-15, May 13, 2021.

* cited by examiner

AUTOMATIC GENERATION OF COMPUTATION KERNELS FOR APPROXIMATING ELEMENTARY FUNCTIONS

FIELD AND BACKGROUND OF THE INVENTION

The present invention, in some embodiments thereof, relates to automatically generating compute kernels to approximate functions, and, more specifically, but not exclusively, to automatically generating polynomial-based kernels computed using scaled fixed-point to approximate functions typically computed using floating-point.

As technology advances, the need for stronger processing systems and computing power rapidly increases. Two common metrics used to measure a processing unit's performance are latency and throughput. Latency is an amount of time it takes a processing unit to perform an identified operation. As used herein, the term "processing unit" is used to mean any kind of programmable or non-programmable circuitry that is configured to carry out a set of operations. A processing unit may comprise hardware as well as software. For example, a processing unit may comprise one or more processors and a transitory or non-transitory memory that carries a program which causes the processing unit to perform the respective operations when the program is executed by the one or more processors.

There exist a variety of methods for improving a processing unit's performance. Some methods increase throughput; others decrease latency. Some methods both increase throughput and reduce latency, although there is usually a tradeoff between the two metrics.

Some of the existing processing units may typically execute sequential streams of instructions which may create bottlenecks, increase latency and/or may be, among other things, power inefficient. Other existing processing units which may employ parallel and/or simultaneous computing of instructions, for example, vector processing and/or the like may present improved performance for some computation tasks, however, may be limited in their processing capabilities due to their inherent fixed architecture, topology and/or structure which may not be adjusted in runtime.

SUMMARY OF THE INVENTION

It is an object of the present invention to provide, methods, systems and software program products for automatically generating polynomial-based kernels computed using scaled fixed-point to approximate functions, typically computed using floating-point, in particular, using processing circuitries comprising runtime adjustable interconnected computing grids capable of adjusting according to each polynomial-based kernel. The foregoing and other objects are achieved by the features of the independent claims. Further implementation forms are apparent from the dependent claims, the description and the figures.

According to a first aspect of the present invention there is provided an apparatus for computing functions using polynomial-based approximation, comprising one or more processing circuitries configured for:

Computing a polynomial-based approximant approximating a function by executing one or more iterations. Each iteration comprising:
Computing the polynomial-based approximant using one or more scaled fixed-point units according to a constructed set of coefficients.
Minimizing an approximation error of the computed polynomial-based approximant compared to the function while complying with one or more constraints selected from a group comprising at least: an accuracy, a compute graph size, a computation complexity, and a hardware utilization of the one or more processing circuitries.
Adjusting one or more of the coefficients of the set of coefficients in case the approximation error is incompliant with the one or more constraints and initiating another iteration.
Outputting the computed polynomial-based approximant with the adjusted set of coefficients for which the computed polynomial-based approximant complies with the one or more constraint to one or more processing circuitries configured to approximate the function by computing the polynomial-based approximant using the adjusted set of coefficients.

According to a second aspect of the present invention there is provided a method for computing functions using polynomial-based approximation, comprising using one or more processing circuitries configured for executing a code. The code comprising:

Code instructions to compute a polynomial-based approximant approximating a function by executing one or more iterations. Each iteration comprising:
Computing the polynomial-based approximant using one or more scaled fixed-point units according to a constructed set of coefficients.
Minimizing an approximation error of the computed polynomial-based approximant compared to the function while complying with one or more constraints selected from a group comprising at least: an accuracy, a compute graph size, a computation complexity, and a hardware utilization of the one or more processing circuitries.
Adjusting one or more of the coefficients of the set of coefficients in case the approximation error is incompliant with the one or more constraints and initiating another iteration.
Code instructions to output the computed polynomial-based approximant with the adjusted set of coefficients for which the computed polynomial-based approximant complies with the one or more constraint to one or more processing circuitries configured to approximate the function by computing the polynomial-based approximant using the adjusted set of coefficients.

In a further implementation form of the first and/or second aspects, an initial set of coefficients is constructed according to the function and a target interval.

In a further implementation form of the first and/or second aspects, the approximation error of the polynomial-based approximant compared to the function is indicative of an accuracy of the polynomial-based approximant, the approximation error is minimized according to minimax approximation with respect to a uniform norm of an error function, the error function is defined as a difference between the function and the polynomial-based approximant.

In an optional implementation form of the first and/or second aspects, a degree and form of the polynomial-based approximant is adjusted and the one or more coefficients are adjusted according to the degree or form adjustment.

In a further implementation form of the first and/or second aspects, the one or more processing circuitries are further configured to generate a code segment for computing the polynomial-based approximant using the adjusted set of coefficients.

In a further implementation form of the first and/or second aspects, the code segment generates a compute graph configured to project the polynomial-based approximant on the one or more processing circuitries.

In a further implementation form of the first and/or second aspects, the one or more processing circuitries having a von Neumann architecture is selected from a group consisting of: a central processing unit, a data processing unit (DPU), a multi-core central processing unit (CPU), a microcontroller unit (MCU) and an accelerated processing unit (ACU).

In a further implementation form of the first and/or second aspects, the one or more processing circuitries having a non-von Neumann architecture is selected from a group consisting of: a data processing unit (DPU), a field-programmable gate array (FPGA), a coarse-grained reconfigurable architecture (CGRA), a neural-network accelerator, an intelligence processing unit (IPU), an application-specific integrated circuit (ASIC), a quantum computer, and an interconnected computing grid, comprising a plurality of reconfigurable logical elements connected by a plurality of configurable data routing junctions.

In a further implementation form of the first and/or second aspects, the one or more processing circuitries comprise one or more interconnected computing grids, comprising: one or more interconnect networks, a plurality of configurable data routing junctions, and a plurality of reconfigurable logical elements connectable by the plurality of configurable data routing junctions and the one or more interconnect networks.

In a further implementation form of the first and/or second aspects, the one or more processing circuitries are further configured for: collecting a plurality of statistical values comprising a plurality of data-statistic values indicative of the computing of the polynomial-based approximant, and analyzing the plurality of statistical values to evaluate the hardware utilization.

In a further implementation form of the first and/or second aspects, the one or more processing circuitries comprise one or more telemetry circuitries for collecting one or more of the plurality of statistical values.

In a further implementation form of the first and/or second aspects, the computation of the polynomial-based approximant comprises one or more monitoring instructions for collecting one or more of the plurality of statistical values.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to automatically generating compute kernels to approximate functions, and, more specifically, but not exclusively, to automatically generating polynomial-based kernels computed using scaled fixed-point to approximate functions typically computed using floating-point.

According to some embodiments of the present invention, there are provided apparatuses, methods and computer program products for automatically generating polynomial-based compute kernels (also known as computation kernels) computed using fixed-point units to approximate functions typically computed using floating-point units, for example, elementary functions and/or transcendental functions such as, for example, trigonometric functions, hyperbolic functions, exponential functions, rational functions, polynomial functions and/or the like as well inverse functions of these functions.

Generating the compute kernel to approximate a certain elementary and/or transcendental function may comprise computing a polynomial-based approximant (compute kernel) which may be computed using one or more processing circuitries employing scaled fixed-point units rather than floating-point units as may be typically done to compute the certain function.

The processing circuitries may be constructed according to one or more conventional architectures, structures, instruction sets and/or the like as known in the rat such as, for example, von Neumann architecture, non-von Neumann architecture and/or the like. However, one or more of the processing circuitries may optionally include one or more interconnected computation grids comprising a plurality of reconfigurable logic elements and supporting memory units which may be dynamically connected in runtime via a plurality of configurable data routing junctions.

The interconnected computing grid may therefore dynamically change and adapt in runtime by adjusting the configurable data routing junctions to connect between sets of the reconfigurable logic elements and memory units according to a compute graph optimized for efficient execution of the current computation task, in particular the computation of the polynomial-based approximant. The compute graph may be a directed acyclic graph constructed of a plurality of nodes connected by edges in which the nodes correspond to operations and the edges correspond to data movement.

Computing the approximant may be an iterative process comprising one or more iterations. First, a polynomial-based approximant may be selected for approximating the certain function according to one or more attributes of the certain function, for example, the type of the function, a domain of definition of the function and/or the like. The selected polynomial-based approximant may include a polynomial, a set of polynomials, or in case of a rational approximant, a quotient of two polynomials, and/or the like. An initial set of coefficients is constructed for the selected polynomial, based on the attribute(s) of the certain function and also based on target interval (i.e., range of values) of interest for approximating the certain function.

The processing circuitry may then compute the polynomial-based approximant according to the constructed set of coefficients. For example, the polynomial-based approximant may be computed by projecting the compute graph of the polynomial-based approximant on the interconnected computing grid, i.e., mapping the nodes and edges of the approximant's compute graph to the reconfigurable logic elements connectable by the configurable data routing junctions. In particular, the interconnected computation grid, reconfiguring the configurable junctions, may adjust according to the projected polynomial-based approximant compute graph on at least some of the reconfigurable logical elements using and/or realizing one or more scaled fixed-point units.

Optionally, the compute kernel created for computing the polynomial-based approximant may include one or more instructions for collecting one or more of a plurality of statistical values collected, captured, recorded and/or stored by one or more hardware telemetry circuitries included in the processing circuitry. The statistical values may relate to one or more aspects of the computation of the polynomial-based approximant conducted by the processing circuitry, for example, data-statistic values, coefficient statistic values, process iteration statistic values and/or the like.

The telemetry circuitry may optionally comprise one or more counters, optionally for collecting historical values of at least some of the data, the compute graph and/or the process executed using the processing circuitry while computing the polynomial-based approximant.

While computing the polynomial-based approximant, the processing circuitry may minimize an approximation error of the polynomial-based approximant with respect to the approximated function. The approximation error may be indicative of how close the approximant is to the function. The processing circuitry may use one or more optimization and/or minimization functions to minimize the approximation error of the polynomial-based approximant which may be defined as the difference between the given function and the approximant. For example, the processing circuitry may apply a minimax approximation in which the approximation error of the polynomial-based approximant is minimized with respect to a norm of the error function, specifically, the uniform norm of the error function. The error function is defined as a difference between the approximated function and the polynomial-based approximant. The maximal value of the error function may be indicative on the worst approximation error. The minimax approximation attempts to minimize, over all possible polynomials, the maximal value of the approximation error function over the approximation interval.

However, the approximation error minimized polynomial-based approximant must further comply with one or more constraints applied to accommodate one or more goals of the approximation of the certain function. The constraints may include, for example, accuracy of the approximation, size of the compute graph, computation latency (time), hardware utilization and/or the like.

In case the approximation error minimized polynomial-based approximant does not comply with the constraint(s), then one or more of the coefficients may be adjusted, and another iteration may be initiated to compute the polynomial-based approximant according to the adjusted set of coefficients. Optionally, a degree of the polynomial-based approximant or its form, may be altered, and one or more coefficients of the set may be adjusted accordingly, i.e., according to the adjusted degree or form.

In case the processing circuitry succeeds in minimizing the approximation error of the polynomial-based approximant while the computation of that polynomial-based approximant complies with the constraint(s), the process may complete and the polynomial-based approximant including the adjusted set of coefficients may be output for use by one or more processing circuits.

For example, one or more processing circuits comprising interconnected computing grids may compute the polynomial-based approximant according to the adjusted set of coefficients by projecting the compute graph of the polynomial-based approximant on their interconnected computing grid.

There may be cases and/or scenarios in which the iterative process may not converge as it may be impossible to identify and/or define a polynomial-based approximant which complies with the constraint(s). In such cases, one or more of the constraints may be relaxed in order to identify a polynomial-based approximant which satisfies the constraint(s). For example, assuming a first constraint defines a certain target (minimal) accuracy for the approximation with respected to the approximated function and a second constraint defines a maximal hardware utilization, for example, a certain maximal number of multipliers. In this exemplary embodiment, the processing circuitry may be unable to adjust the polynomial-based approximant and/or its set of coefficients such that the computed polynomial-based approximant satisfies the first and second constraints. In such case, the first and/or second constraints may be relaxed, and the iterative process may be repeated in order to identify and define a polynomial-based approximant which satisfies the relaxed constraint(s).

Computing polynomial-based compute kernels using fixed point units, to approximate functions which are typically computed using floating-point, may present major benefits and advantages over currently existing devices, systems and/or methods for computing functions.

First, using processing circuitries employing scaled fixed-point units to approximate the functions may significantly reduce complexity of the processing circuitries compared to some of the existing architectures and/or solutions which may use floating-point units. Such floating-point circuitries may be based on significantly more complex hardware which is resource intensive, thus, significantly increasing size (real estate utilization) of the processing circuitry, power consumption of the processing circuitry and/or cost of the processing circuitry.

Due to the complex architecture of floating-point units, floating-point based computation of a function may significantly increase the computation latency, compared to the fast fixed-point based computation. This is because each floating-point operation is composed of sub-operations that are necessary for the correct computation of a floating-point operation. Consequently, a floating-point based computation of a function will be comprised of many such sub-operations. A scaled fixed-point based computation, on the other hand, may rely on a significantly reduced number of sub-operations and may typically not require such sub-operations at all.

In addition, since the floating-point units may increase size, power consumption and/or cost of the processing circuitry, the processing circuitry may include only a limited number of such units thus limiting the computation throughput and/or parallel computing of the processing circuitry using the floating-point units as may be done by the existing methods. In contrast, using fixed-point units which are significantly simpler, more power efficient and highly faster, the computation throughput and/or parallel computing of the processing circuitry may be significantly increased.

Moreover, computing the polynomial-based approximant to approximate the function by projecting the compute graph of the polynomial-based approximant on the interconnected computing grid of the processing circuitry which is adjustable in runtime according to the computed polynomial-based approximant may significantly reduce the compute graph size, the computation latency, the computation complexity, the hardware utilization of the interconnected computing grid and/or the like.

Furthermore, analyzing the statistical values monitored and collected during the computation of the polynomial-based approximant and reconfiguring the computation and/or the interconnected computing grid accordingly may enable efficient projection of the polynomial-based approximant on the interconnected computing grid which may increase accuracy of the approximation, reduce the compute graph size, reduce the computation complexity and/or latency, reduce the hardware utilization and/or the like.

Also, applying the constraint(s) may enable adaptation of the compute graph configured to project the polynomial-based approximant on the interconnected computing grid according to specific requirements and/or needs of one or more target processing circuitries and/or applications. For example, assuming a first target application requires high accuracy approximation while a second application requires a reduced accuracy approximation. In such case, the constraint(s) applied for the polynomial-based approximant computed for the first application may be set to define a significantly smaller approximation error of the computed polynomial-based approximant while the constraint(s) applied for the polynomial-based approximant computed for the second application may be set to define a larger approximation error.

In another example, assuming the target processing circuitries are limited size circuitries having a reduced number of computing resources, for example, reconfigurable logic elements. In such case, the constraint(s) may be set to define a maximal number of logic elements which does not exceed a predefined number of reconfigurable logic elements.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
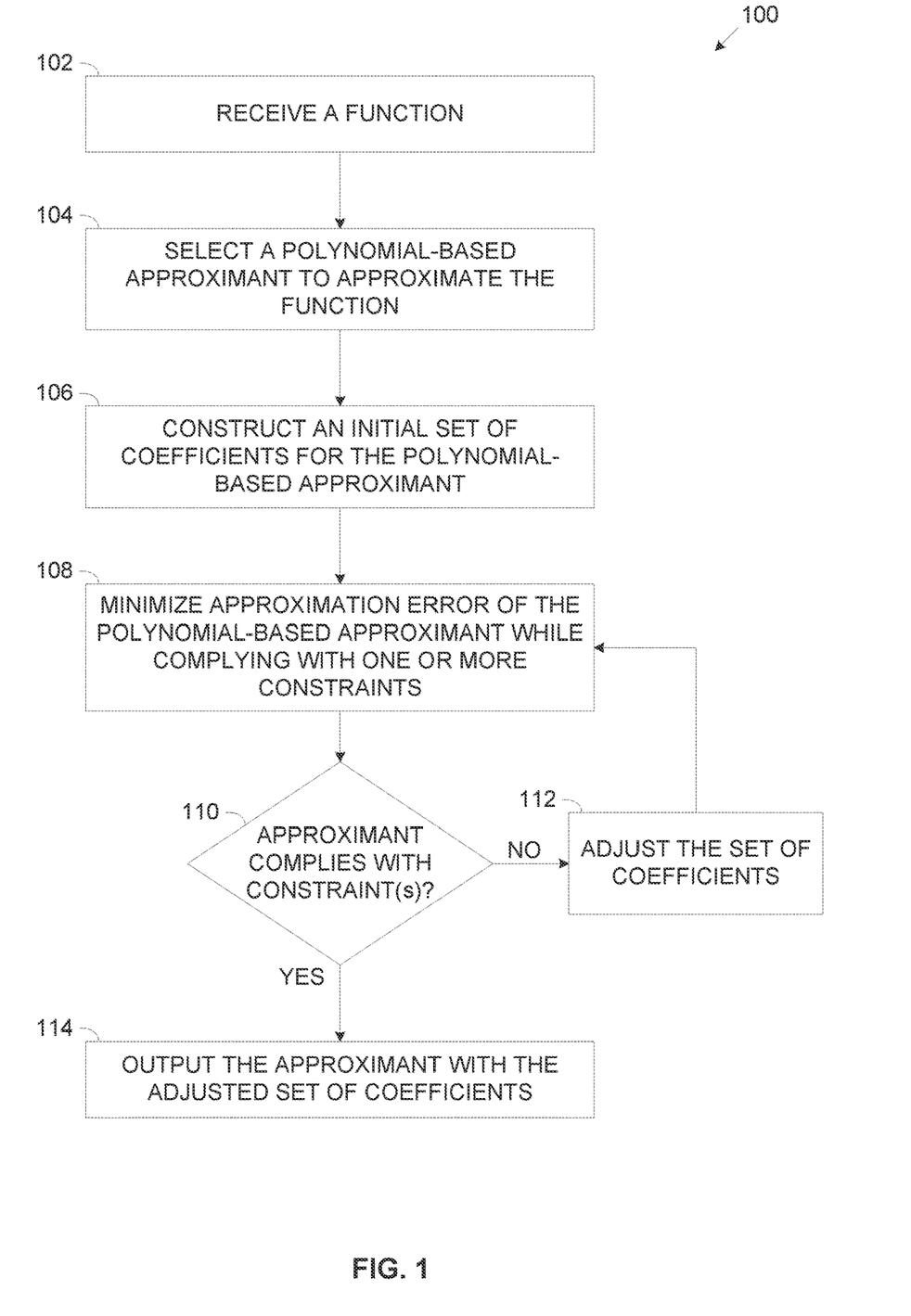
FIG. 1 is a flowchart of an exemplary process of computing a polynomial-based approximant for approximating a function using a fixed-point unit, according to some embodiments of the present invention.

Referring to the drawings, FIG. 1 is a flowchart of an exemplary process of computing a polynomial-based approximant for approximating a function using a fixed-point unit, according to some embodiments of the present invention.

An exemplary process 100 may be executed to construct one or more compute kernels, specifically polynomial kernels (designated polynomial-based approximant hereinafter) for approximating, using scaled fixed-point unit(s), one or more functions typically computed using floating point units.

The process 100 is an iterative process comprising a plurality of iterations conducted using one or more processing circuitries to minimize an approximation error of the polynomial-based approximant compared to the actual result of a received function according to one or more optimization and/or minimization functions. In particular, the approximation error of the polynomial-based approximant may be minimized while complying with one or more constraints predefined for the approximation task, for example, an accuracy, a compute graph size, a computation complexity, a hardware utilization of the at least one processing circuit and/or the like.

In case the approximation error minimized polynomial-based approximant does not comply with the constraint(s), one or more coefficients of the set of coefficients of the polynomial-based approximant may be adjusted and another iteration may be initiated. Optionally, the degree or form of the polynomial-based approximant is also adjusted and the set of coefficients may be adjusted accordingly.

One or more additional iterations may be initiated until the computation of the approximation error minimized polynomial-based approximant complies with the constraint(s).

Once a polynomial-based approximant with its set of coefficients is determined to yield a minimal approximation error while complying with the constraint(s), the polynomial-based approximant and its adjusted set of coefficients may be output for use by one or more processing circuitries configured to approximate the function by computing the polynomial-based approximant using scaled fixed-point unit(s).

Computing the polynomial-based approximant and its set of coefficients may be done offline, meaning that the polynomial-based approximant and its set of coefficients may be computed in advance and provided to one or more processing circuitries for future use to approximate the function. However, the polynomial-based approximant and its set of coefficients may be computed substantially online, for example, in response to receiving a function, an approximation interval, accuracy requirements, and/or other aforementioned constraints.

Figure 2:
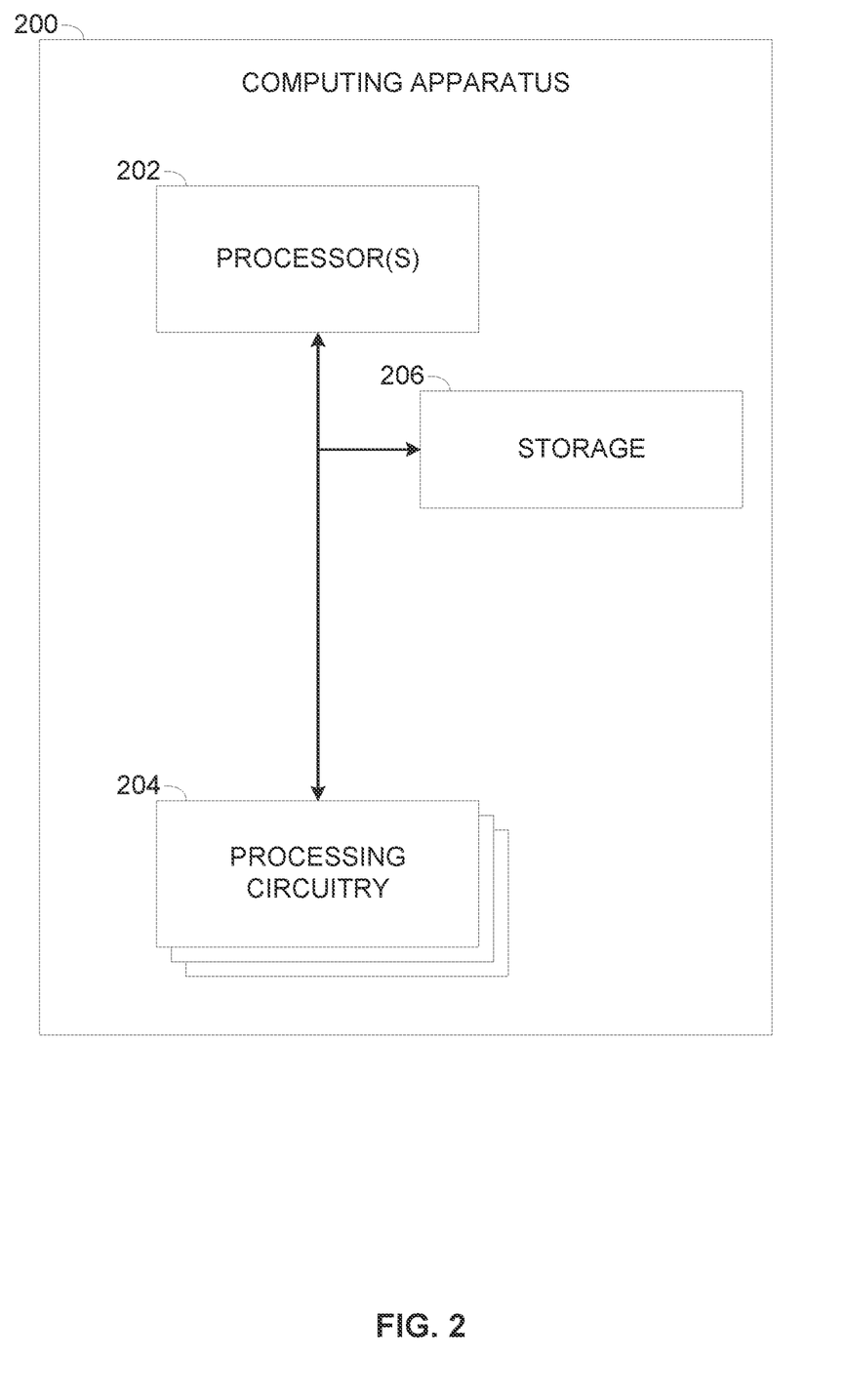
FIG. 2 is a schematic illustration of an exemplary system for computing a polynomial-based approximant for approximating a function using a fixed-point unit, according to some embodiments of the present invention.

Reference is also made to FIG. 2, which is a schematic illustration of an exemplary system for computing a polynomial-based approximant for approximating a function using a fixed-point unit, according to some embodiments of the present invention.

An exemplary computing apparatus 200 may comprise one or more processing circuitries 204 configured for processing and/or manipulating data, for example. For brevity, unless explicitly noted, henceforth the term "processing circuitry" is used to mean both "one or more processing circuitry" and "at least one processing circuitry" and the terms are used interchangeably.

The processing circuitry 204 may employ one or more processor architectures, structures and/or instructions sets and/or the like. For example, one or more of the processing circuitry 204 may optionally have a von Neumann architecture, for example, a Central Processing Unit (CPU), a multi-core CPU, a Data Processing Unit (DPU), a Microcontroller Unit (MCU) an Accelerated Processing Unit (ACU) and/or the like. In another example, one or more of the processing circuitry 204 may optionally have a non-von Neumann architecture, for example, a Graphical Processing Unit (GPU), a DPU, a Field-Programmable Gate Array (FPGA), a Coarse-Grained Reconfigurable Architecture (CGRA), a neural-network accelerator, an Intelligence Processing Unit (IPU), an Application-Specific Integrated Circuit (ASIC), a quantum computer, an interconnected computing grid and/or the like.

The computing apparatus 200 may further comprise one or more processor(s) 202. The processor(s) 202 may be applied, used, and/or configured for one or more actions and/or operations. Optionally, the processor(s) 202 may be configured as host processor adapted to configure, control and/or interact with one or more of the processing circuitry(s) 204.

The processor(s) 202 may employ one or more architectures, structures and/or instructions sets and/or the like. Optionally, the processor(s) 202 may have a von Neumann architecture.

The computing apparatus 200 may comprise a storage 206 configured and/or connected to support the processor(s) 202 and/or one or more of the processing circuitry 204. The storage 206 may include one or more non-transitory persistent storage devices, for example, a Read Only Memory (ROM), a Flash array, a Solid State Drive (SSD), a hard drive (HDD) and/or the like. The storage 206 may also include one or more volatile devices, for example, a Random Access Memory (RAM) component, a cache and/or the like. The storage 206 may further comprise one or more network storage devices, for example, a storage server, a Network Accessible Storage (NAS), a network drive, a database server and/or the like accessible via one or more network interfaces of the computing apparatus 200.

The processor(s) 202 may be electrically coupled and connected to one or more of the processing circuitry 204 via one or more digital interconnections and/or networks deployed in the processing apparatus 200. Such interconnections connecting may include, for example, a Compute Express Link (CXL) interconnect, a Gen-Z cache coherent interconnect for accelerators (CCIX), a Coherent Accelerator Processor Interface (CAPI), a Peripheral Component Interconnect Express (PCI-e) and/or the like. The networks connecting the processor(s) 202 and the processing circuitry 204 may incudes, for example, a Local Area Network (LAN), for example an Ethernet network or a wireless network, a Wide Area Network (WAN) and/or the like.

Optionally, the processing circuit 204 comprises one or more interconnected computing grids each comprising a plurality of reconfigurable logical elements and memory units connected by a plurality of configurable data routing junctions. The interconnected computing grid may therefore dynamically change and adapt in runtime to connect between the reconfigurable processing resources and/or memory units to create a compute graph optimized for efficient execution of the computation task (e.g., compute kernel, algorithm, program, etc.) currently executed using the interconnected computing grid.

The compute graph may be a directed acyclic graph constructed of a plurality of nodes connected by edges in which the nodes correspond to operations of the computation task and the edges correspond to data movement between the operations. The compute graph of the computation task may be therefore projected on interconnected computing grid(s) by mapping the nodes (operations) of the compute graph of the computation task to the reconfigurable logic elements and configuring the configurable data routing junctions to connect the nodes according to the edges of the compute graph.

This means that in runtime, during execution of each specific computation task, the computation task may be analyzed to determine its requirements and the interconnected computing grid may be adjusted and/or adapted accordingly to optimize execution of the respective computation task, for example, reduce the size of the compute graph utilizing the computation task, reducing computation complexity, reducing computation latency (time), reducing hardware utilization of the processing circuitry 204 and/or the like.

The processing circuitry 204 may be applied, configured and/or initiated to compute, optionally together with the processor(s) 202, one or more compute kernels (computation kernels), for example, polynomial-based approximants for approximating one or more functions typically computed using a floating-point unit. In particular, the processing circuitry 204 may be configured, adapted and/or controlled to compute the polynomial-based approximants using one or more scaled fixed-point units which may significantly reduce the size of the compute graph, reduce the computation complexity, reduce the computation latency, increase the hardware utilization and/or the like.

Figure 3:
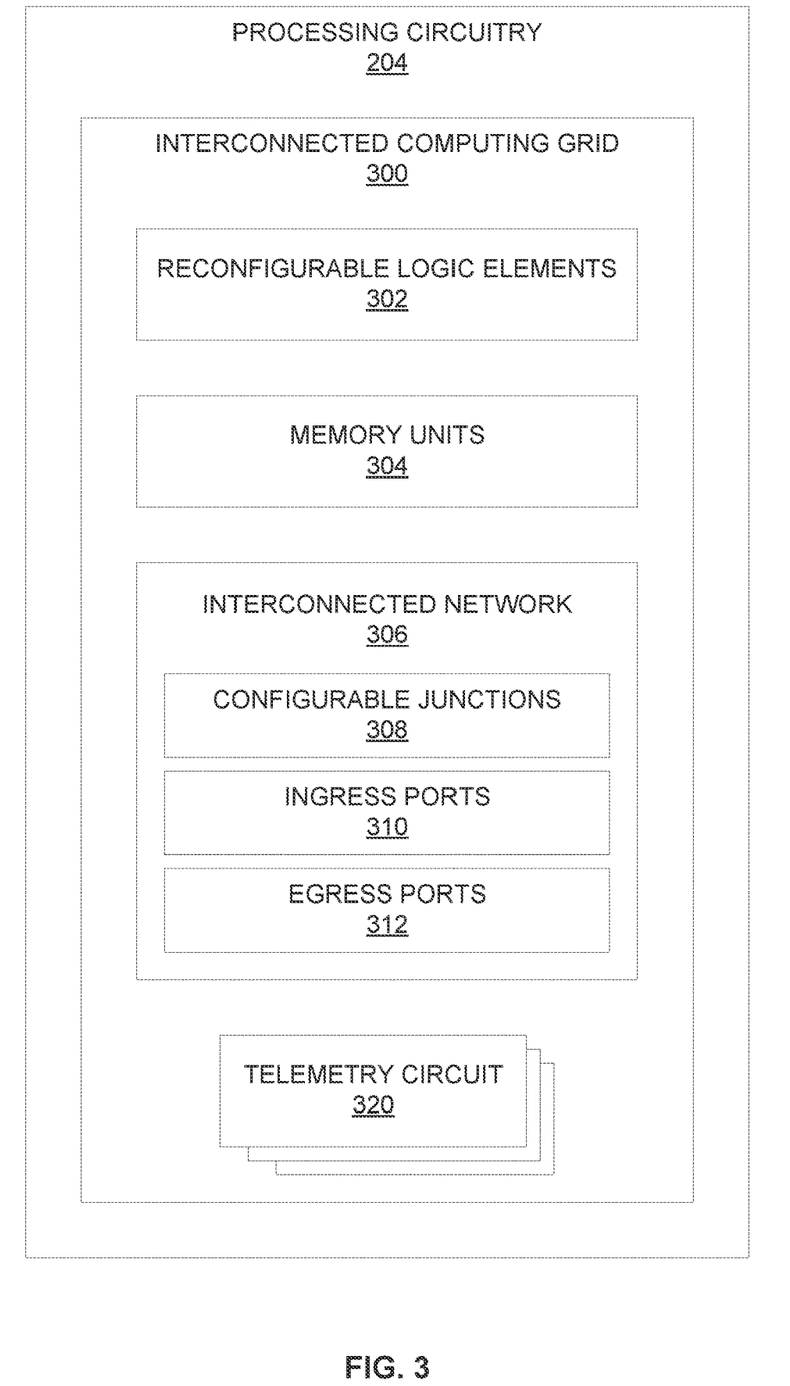
FIG. 3 is a schematic illustration of an exemplary processing circuit comprising an interconnected computing grid applied to compute a polynomial-based approximant for approximating a function using a fixed-point unit, according to some embodiments of the present invention.

Reference is now made to FIG. 3, which is a schematic illustration of an exemplary processing circuit comprising an interconnected computing grid applied to compute a polynomial-based approximant for approximating a function using a fixed-point unit, according to some embodiments of the present invention.

A processing circuitry such as the processing circuitry 204 may include an interconnected computing grid 300 comprising a plurality of reconfigurable logical elements 302 and a plurality of memory units 304 connectable via an interconnected network 306.

The interconnected network 306 may comprise a plurality of configurable data routing junctions 308, plurality of ingress ports 310 and a plurality of egress ports 312 which may be configured to connect between one or more of the reconfigurable logical elements 302 and/or one or more of the memory units 304.

The configurable data routing junctions 308 may be dynamically reconfigured to connect between one or more of the reconfigurable logical elements 302 and one or more other reconfigurable logical elements 302 and/or one or more of the memory units 304. Moreover, one or more of the ingress ports 310 and/or the egress ports 312 may be connected via the configurable data routing junctions 308 to further connect between one or more of the reconfigurable logical elements 302 and/or one or more of the memory units 304.

For example, a set of reconfigurable logical elements 302 may be interconnected via one or more configurable data routing junctions 308, and optionally additionally via one or more ingress ports 310 and/or egress ports 312. In another example, serval reconfigurable logical elements 302 may be interconnected to each other and further connected to one or more memory units 304 via one or more configurable data routing junctions 308, and optionally additionally via one or more ingress ports 310 and/or egress ports 312.

The processing circuitry 204, specifically the interconnected computing grid 300 may optionally include hardware, for example, one or more telemetry circuitries 320, optionally for the purpose of collecting, capturing, recording and/or storing one or more statistical values, optionally while processing circuitry 204 executes one or more computational tasks, specifically, compute graphs and/or compute instructions.

The statistical values may include, for example, one or more data-statistic values relating to the data processed using the processing circuitry 204. In another example, the statistical values may include one or more statistical values relating to the compute graph executed using the processing circuitry 204, for example, one or more statistic values regarding the approximation interval. In another example, the statistical values may include one or more statistical values relating to the computation task executed using the processing circuitry 204, for example, one or more process iteration statistic values.

Optionally, the telemetry circuitry(s) 320 may further comprise one or more counters and/or one or more memory areas for collecting historical values of at least some of the data, the compute graph and/or the process executed using the processing circuitry 204. For example, the historical values may include one or more coefficients of the polynomial-based approximant previously selected during the current computation task (e.g., previous iterations) and/or one or more previous computation tasks. The historical values may further include one or more data variables, for example, a RISC-V processor counter, a high bandwidth memory controller counter, and a memory channel counter.

Reference is made once again to FIG. 1.

The process 100 may be executed by the processing circuitry 204, by the processor(s) 202 and/or by a combination thereof to compute one or more compute kernels, specifically polynomial-based approximants for approximating one or more functions typically computed using a floating-point unit.

In particular, for each approximated function, the process 100 may be executed to generate a compute graph configured to project the polynomial-based approximant on the processing circuitry 204, specifically on the interconnected computation grid 300 of the processing circuitry 204 configured to use one or more scaled fixed-point units.

The polynomial-based approximant computed in the process 100 may be then used by one or more processing circuitries such as the processing circuitry 204 for efficiently approximating the function(s) using fixed-point units.

As shown at 102, the process 100 starts with the processing circuitry 204 and/or the processor(s) 202 receiving a function which is typically computed using floating-point units.

The function may include, for example, an elementary function and/or a transcendental function such as, for example, a trigonometric function, a hyperbolic function, an exponential function, a rational function, a polynomial function and/or the like as well an inverse function of one of these functions.

In addition to receiving the function to be approximated, the processing circuitry 204 and/or the processor(s) 202 may further receive a target interval of interest, i.e., a range of values (x), for approximating the received function.

As shown at 104, the processing circuitry 204 and/or the processor(s) 202 may select a compute kernel (computation kernel), specifically a polynomial-based approximant (kernel) for approximating the received function. The processing circuitry 204 and/or the processor(s) 202 may further select one or more initial polynomial properties for the selected polynomial-based approximant. The properties of the polynomial-based approximant may be, for example, its parity, degrees of the terms, approximation points for consideration, and the like.

The selected polynomial-based approximant may include a polynomial approximant, a rational approximant which is based on multiple polynomials, for example, a quotient of two polynomials and/or the like.

The polynomial-based approximant selected to approximate the received function may be selected according to one or more attributes of the received function, for example, the type of the function, a domain of definition of the function and/or the like. For example, the polynomial-based approximant may be selected according to a variation of Remez algorithm as known in the art. However, selection of the initial polynomial and/or its properties is beyond the scope of this disclosure.

For example, a first polynomial-based approximant, for example, $Ax^3+Bx^2+Cx^1+Dx^0$ may be selected to approximate a sine function. In another example, a second polynomial-based approximant, for example, $Ax^5+Bx^4+Cx^3+Dx^2+Ex^1+Fx^0$ may be selected to approximate a certain exponential function.

As shown at 106, the processing circuitry 204 and/or the processor(s) 202 may construct an initial set of coefficients for the selected polynomial-based approximant.

One or more methods, techniques and/or algorithms known in the art may be applied for constructing and/or selecting the initial set of coefficients. The selection of the initial set of coefficients is thus beyond the scope of this disclosure.

However, the processing circuitry 204 and/or the processor(s) 202 may construct and/or select the initial set of coefficients according to the attribute(s) of the received function and optionally also according to received target interval. For example, a system of linear equations may be constructed for an initial set of points, such that the initial set of coefficients may correspond to a solution of the linear system of equations. The initial set of points (also known as a reference points) may be set, for example, based on roots to Chebyshev polynomial of the first kind transformed into the target interval.

For example, a first initial set of coefficients, for example, $[A_1, B_1, C_1, D_1]$ may be selected for an exemplary polynomial-based approximant to form a polynomial based approximant $A_1x^3+B_1x^2+C_1x^1+D_1$ for approximating the sine function in a first interval while a second initial set of coefficients, for example, $[A_2, B_2, C_2, D_2]$ may be selected for an exemplary polynomial-based approximant to form a polynomial-based approximant $A_2x^3+B_2x^2+C_2x^1+D_2$ for approximating the sine function in a second interval.

In another example, a first initial set of coefficients, for example, $[A_3, B_3, C_3, D_3, E_3, F_3]$ may be selected for an exemplary polynomial-based approximant to form a polynomial $A_3x^5+B_3x^4+C_3x^3+D_3x^2+E_3x^1+F_3$ for approximating a certain exponential function in a first interval while a second initial set of coefficients, for example, $[A_4, B_4, C_4, D_4, E_4, F_4]$ may be selected for an exemplary polynomial-based approximant to form a polynomial-based approximant $A_4x^5+B_4x^4+C_4x^3+D_4x^2+E_4x^1+F_4$ for approximating the certain exponential function in a second interval.

As shown at 108, the processing circuitry 204 may compute the polynomial-based approximant for approximating the received function over the target interval. In particular, the processing circuitry 204 may compute the polynomial-based approximant using one or more scaled fixed-point units deployed, realized, implemented and/or operated according to the architecture of the processing circuitry 204.

For example, the processing circuitry 204 may compute the polynomial-based approximant by generating a compute graph configured to project the selected polynomial-based approximant with the selected set of coefficients on the processing circuitry 204, specifically on the interconnected computation grid 300. The interconnected computation grid 300 may adjust according to the projected polynomial-based approximant on at least some of the reconfigurable logical elements 302 using and/or realizing one or more scaled fixed-point units by reconfiguring the interconnected network accordingly, for example, one or more of the configurable data routing junctions 308, one or more of the ingress ports 310 and/or one or more of the egress ports 312.

Optionally, the processing circuitry 204 may collect one or more of the plurality of statistical values captured by one or more of the telemetry circuitries 320 during the computation of the polynomial-based approximant. Specifically, the compute kernel, i.e., the computation of the polynomial-based approximant may further comprise one or more monitoring instructions executed by the processing circuitry 204 for collecting statistical value(s) which may comprise a plurality of data-statistic values indicative of the computing of the polynomial-based approximant.

In particular, the processing circuitry 204 and/or the processor(s) 202 may minimize the approximation error of the polynomial-based approximant compared to the approximated function. The approximation error of the polynomial-based approximant may be indicative of how close the approximant is to the approximated function.

The processing circuitry 204 and/or the processor(s) 202 may apply one or more optimization and/or minimization functions to compute and/or minimize the approximation error of the polynomial-based approximant which may be defined as the difference between the approximated function and the approximant. For example, the processing circuitry 204 and/or the processor(s) 202 may apply minimax approximation in which the approximation error of the polynomial-based approximant is minimized with respect to a norm of the error function, specifically, the uniform norm of the error function. The error function is defined as a difference between the approximated function and the polynomial-based approximant. The minimax approximation attempts to minimize, over all possible polynomials, the maximal value of the error function over the approximation interval. In order to compute and minimize the approximation error, the approximated function may be computed over the target interval using one or more floating-point units.

Moreover, the processing circuitry 204 and/or the processor(s) 202 may attempt to minimize the approximation error of the polynomial-based approximant while complying with one or more constraints which may be predefined for the computation of the polynomial-based approximant over the target interval.

The constraints may be applied to accommodate one or more goals of the function approximation. For example, a minimal accuracy of the approximation may be required. In another example, the processing circuits 204 may have a reduced availability of resources, and therefore, the computation of the polynomial-based approximant must utilize significantly fewer hardware resources for being able to be processed by the processing circuits 204. In a different example, the computation of the polynomial-based approximant may be required to accommodate a maximal latency, i.e., computed within a maximal time interval.

The constraints, as described, may therefore include an accuracy of the approximation of the polynomial-based approximant. The accuracy may be computed by comparing the result (outcome) of the polynomial-based approximant, over the target interval, to a high accuracy result of the received function which may be received and/or computed using one or more floating-point units.

In another example, the constraints may include a size of the compute graph, i.e., the size of the projection of the polynomial-based approximant on the interconnected computation grid 300 in terms of the number of utilized logic elements. The size of the compute graph may define the path of the compute graph, i.e., the path of the projected polynomial-based approximant on the interconnected computation grid 300 including a length of the compute graph which may be indicative of a compute latency (compute time) of the approximation polynomial-based approximant.

In another example, the constraints may include computation complexity of the compute graph which may relate to the resources of the interconnected computation grid 300 used to project the polynomial-based approximant, for example, resources type, number of resources, complexity of the logic and/or arithmetic operations conducted by the resources and/or the like. For example, the computation complexity may relate to the number of logic and/or arithmetic operations conducted by the reconfigurable logic elements 302 selected to project the polynomial-based approximant. In another example, the computation complexity may relate to the type of resources of the interconnected computation grid 300 selected to realize and/or utilize one or more elements of the compute graph, for example, one or more scaled fixed-point units.

In another example, the constraints may include hardware utilization of the processing circuitry 204, for example, a maximal hardware utilization of the interconnected computation grid 300. The hardware utilization may relate, for example, to the number of reconfigurable logic elements 302 used to realize and/or implement the compute graph projecting the polynomial-based approximant on the interconnected computation grid 300. In another example, the hardware utilization may relate to the number of memory units 304 used to realize and/or implement the compute graph projecting the polynomial-based approximant on the interconnected computation grid 300.

Optionally, the processing circuitry 204 may analyze one or more of the collected statistical values, specifically the data-statistic values indicative of the computing of the polynomial-based approximant in order to evaluate the hardware utilization of the processing circuitry 204, specifically of the interconnected computing grid 300 during the computation of the polynomial-based approximant.

As shown at 110, which is a conditional step, in case the computation of the minimized error polynomial-based approximant complies with the one or more constraints applied in step 108, the process 100 may branch to 114 and complete. However, in case the minimized error polynomial-based approximant does not comply with one or more of the constraints applied in step 108, the process 100 may branch to 112 to initiate another iteration of the process 100 with an adjusted set of coefficients.

As shown at 112, since the computed polynomial-based approximant did not comply with the applied constraints, the processing circuitry 204 and/or the processor(s) 202 may adjust one or more coefficients of the set of coefficients used to compute the polynomial-based approximant in another attempt to minimize the approximation error of the polynomial-based approximant compared to the actual result of the received function under (according to) the applied constraint(s).

The coefficient(s) may be adjusted according to the observed approximation error and/or non-compliance with one or more of the constraints. For example, a new set of (reference) points may be computed, following which, a new linear system of equations may be constructed such that the adjusted (new) set of coefficients may correspond to the solution to the new linear system of equations. The iterative process of adjusting the set of coefficients according to the linear system of equations may ensure that the adjusted (new) set of coefficients minimizes the approximation error of the polynomial-based approximant compared to the certain function.

Moreover, the polynomial-based approximant may be evaluated and/or emulated on the processing circuit 204 in order to verify that the selected coefficients are converted to a suitable scaled fixed-point form since in case the form of the coefficients is not suitable, a computation error may arise. In case of such a computation error, the scaled fixed-point form may be adjusted, and the evaluation may be repeated.

Furthermore, the processing circuitry 204 and/or the processor(s) 202 may execute an automatic numerical analysis in parallel with running tests for estimating an accuracy of the polynomial-based approximant which may ensure that estimated approximation errors comply with the expected approximation errors. In case the overall approximation error complies with the accuracy constraint (requirements), the iterative adjustment process 100 may be stopped and the adjusted set of scaled fixed-point coefficients is output.

The telemetry statistical values may be used to refine the approximation to a particular interval and/or to modify the form of the polynomial-based approximant. In both cases, a new set of coefficients may be computed and a new polynomial-based approximant that better complies with the constraints may be created. For example, initial polynomial-based approximant may be created to approximate the sine function in the interval $$\left[0, \frac{\pi}{4}\right].$$

If the telemetry statistical values indicate and/or reveal that all input arguments to the sine function are in the interval [0, π/8]. In such case, a new polynomial-based approximant may be created to approximate the sine function in the smaller interval, resulting in a smaller compute graph size, smaller approximation error, and/or the like.

Optionally, the processing circuitry 204 and/or the processor(s) 202 may adjust a degree and/or a form of the polynomial-based approximant to further reduce the approximation error of the result of the computed polynomial-based approximant compared to the actual result of the received function under the applied constraint(s). The processing circuitry 204 and/or the processor(s) 202 may further adjust adjusting one or more of the coefficients according to the adjusted degree and/or the adjusted form of the polynomial-based approximant.

As shown at 114, in case the approximation error of the polynomial-based approximant computed with the adjusted set of coefficients complies with the applied constraint(s), the processing circuitry 204 and/or the processor(s) 202 may output the computation kernel, i.e., the final polynomial-based approximant and its adjusted coefficients.

Optionally, in case the iterative process 100 does not converge and a polynomial-based approximant which complies with the constraint(s) cannot be computed and/or identified, one or more of the constraints may be relaxed in order to identify such a polynomial-based approximant which does satisfy the constraint(s). For example, assuming a first constraint defines a certain target (minimal) accuracy for the approximation error of the polynomial-based approximant with respected to the approximated function and a second constraint defines a maximal hardware utilization, for example, a certain maximal number of multipliers. Further assuming that, following one or more iterations of the process 100, the processing circuitry 204 and/or the processor(s) 202 may be unable to adjust the polynomial-based approximant and/or its set of coefficients such that the computed polynomial-based approximant satisfies, both, the first and the second constraints. In such case, the first and/or second constraints may be relaxed and the iterative process 100 may be repeated with one or more iterations in order to identify and define a polynomial-based approximant which satisfies the relaxed constraint(s).

One or more processing circuitries such as the processing circuit 204 may receive the polynomial-based approximant and its set of coefficients and may compute the polynomial-based approximant using scaled fixed-point unit(s) to approximate the received function, specifically over the target interval.

Optionally, the processing circuitry 204 and/or the processor(s) 202 may be further configured to generate one or more code segments for computing the polynomial-based approximant using the adjusted set of coefficients. In particular, one or more code segments may generate the compute graph configured to project the polynomial-based approximant on the processing circuitry 204, specifically on the interconnected computing grid 300.

One or more processing circuitries such as the processing circuit 204 may use the generated code segment(s) to generate the compute graph in order to project the polynomial-based approximant on their interconnected computing grid 300 and compute an approximation for the received function in the target interval.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms processor architectures and interconnected computation grid are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An apparatus for computing functions using polynomial-based approximation, comprising at least one processing circuitry, the at least one processing circuitry comprises at least one interconnected computing grid, the at least one interconnected computing grid comprising:
   at least one interconnect network,
   a plurality of configurable data routing junctions, and
   a plurality of reconfigurable logical elements connectable by the plurality of configurable data routing junctions and the at least one interconnect network;
   the at least one processing circuitry is configured for:
      computing a polynomial-based approximant approximating a function by executing at least one iteration, the at least one iteration comprising:
         computing the polynomial-based approximant using at least one scaled fixed-point unit according to a constructed set of coefficients,
         minimizing an approximation error of the computed polynomial-based approximant compared to the function while complying with at least one constraint selected from a group comprising at least: an accuracy, a compute graph size, a computation complexity, and a hardware utilization of the at least one processing circuitry,
         adjusting at least one of the coefficients of the set of coefficients in case the approximation error is incompliant with the at least one constraint and initiating another iteration, and
      outputting the polynomial-based approximant with the adjusted set of coefficients for which the computed polynomial-based approximant complies with the at least one constraint to at least one processing circuitry configured to approximate the function by computing the polynomial-based approximant using the adjusted set of coefficients.

2. The apparatus of claim 1, wherein an initial set of coefficients is constructed according to the function and a target interval.

3. The apparatus of claim 1, wherein the approximation error of the polynomial-based approximant compared to the function is indicative of an accuracy of the polynomial-based approximant, the approximation error is minimized according to minimax approximation with respect to a uniform norm of an error function, the error function is defined as a difference between the function and the polynomial-based approximant.

4. The apparatus of claim 1, further comprising adjusting a degree and form of the polynomial-based approximant and adjusting the at least one coefficient according to the degree or form adjustments.

5. The apparatus of claim 1, wherein the at least one processing circuitry is further configured to generate a code segment for computing the polynomial-based approximant using the adjusted set of coefficients.

6. The apparatus of claim 5, wherein the code segment generates a compute graph configured to project the polynomial-based approximant on the at least one processing circuitry.

7. The apparatus of claim 1, wherein the at least one processing circuitry having a von Neumann architecture is selected from a group consisting of: a central processing unit, a data processing unit (DPU), a multi-core central processing unit (CPU), a microcontroller unit (MCU) and an accelerated processing unit (ACU).

8. The apparatus of claim 1, wherein the at least one processing circuitry having a non-von Neumann architecture is selected from a group consisting of: a data processing unit (DPU), a field-programmable gate array (FPGA), a coarse-grained reconfigurable architecture (CGRA), a neural-network accelerator, an intelligence processing unit (IPU), an application-specific integrated circuit (ASIC), a quantum computer, and an interconnected computing grid, comprising a plurality of reconfigurable logical elements connected by a plurality of configurable data routing junctions.

9. The apparatus of claim 1, wherein the at least one processing circuitry is further configured for:
collecting a plurality of statistical values comprising a plurality of data-statistic values indicative of the computing of the polynomial-based approximant, and
analyzing the plurality of statistical values to evaluate the hardware utilization.

10. The apparatus of claim 9, wherein the at least one processing circuitry comprises at least one telemetry circuitry for collecting at least one of the plurality of statistical values.

11. The apparatus of claim 9, wherein the computation of the polynomial-based approximant comprises at least one monitoring instruction for collecting at least one of the plurality of statistical values.

12. A method of computing functions using polynomial-based approximation, comprising using at least one processing circuitry, the at least one processing circuitry comprises at least one interconnected computing grid, the at least one interconnected computing grid comprising:
at least one interconnect network,
a plurality of configurable data routing junctions, and
a plurality of reconfigurable logical elements connectable by the plurality of configurable data routing junctions and the at least one interconnect network;
the at least one processing circuitry is configured for executing a code, the code comprising:
code instructions to compute a polynomial-based approximant approximating a function by executing at least one iteration, the at least one iteration comprising:
computing the polynomial-based approximant using at least one scaled fixed-point unit according to a constructed set of coefficients,
minimizing an approximation error of the computed polynomial-based approximant compared to the function while complying with at least one constraint selected from a group comprising at least: an accuracy, a compute graph size, a computation complexity, and a hardware utilization of the at least one processing circuitry,
adjusting at least one of the coefficients of the set of coefficients in case the approximation error is incompliant with the at least one constraint and initiating another iteration, and
code instructions to output the polynomial-based approximant with the adjusted set of coefficients for which the computed polynomial-based approximant complies with the at least one constraint to at least one processing circuitry configured to approximate the function by computing the polynomial-based approximant using the adjusted set of coefficients.

13. The method of claim 12, wherein an initial set of coefficients is constructed according to the function and a target interval.

14. The method of claim 12, wherein the approximation error of the polynomial-based approximant compared to the function is minimized according to minimax approximation with respect to a uniform norm of an error function, the error function is defined as a difference between the function and the polynomial-based approximant.

15. The method of claim 12, further comprising adjusting a degree and form of the polynomial-based approximant and adjusting the at least one coefficient according to the degree or form adjustment.

16. The method of claim 12, further comprising generating a code segment for computing the polynomial-based approximant using the adjusted set of coefficients.

17. The method of claim 16, wherein the code segment generates a compute graph configured to project the polynomial-based approximant on the at least one processing circuitry.

18. The method of claim 12, wherein the at least one processing circuitry is further configured for:
collecting a plurality of statistical values comprising a plurality of data-statistic values indicative of the computing of the polynomial-based approximant, and
analyzing the plurality of statistical values to evaluate the hardware utilization.

\* \* \* \* \*